(12) United States Patent
Niederberger

(10) Patent No.: US 8,459,384 B2
(45) Date of Patent: Jun. 11, 2013

(54) CLIMBING ROBOT FOR TRAVELLING OVER ADHESIVE SURFACES

(76) Inventor: Anton Niederberger, Oberdorf (CH)

( * ) Notice: Subject to any disclaimer, the term of this patent is extended or adjusted under 35 U.S.C. 154(b) by 0 days.

(21) Appl. No.: 13/499,289

(22) PCT Filed: Sep. 25, 2010

(86) PCT No.: PCT/EP2010/005875
§ 371 (c)(1),
(2), (4) Date: Mar. 30, 2012

(87) PCT Pub. No.: WO2011/038870
PCT Pub. Date: Apr. 7, 2011

(65) Prior Publication Data
US 2012/0181096 A1    Jul. 19, 2012

(30) Foreign Application Priority Data
Oct. 1, 2009  (DE) .......................... 10 2009 047 992

(51) Int. Cl.
*B62D 51/06* (2006.01)
(52) U.S. Cl.
USPC ............. 180/8.6; 180/8.5; 180/164; 180/901; 901/1; 318/568.12
(58) Field of Classification Search
USPC ..... 180/8.5–8.7, 164, 901; 901/1; 318/568.12
See application file for complete search history.

(56) References Cited

U.S. PATENT DOCUMENTS

| 5,411,108 A | * | 5/1995 | Lobachev et al. ............... 180/8.7 |
| 5,890,553 A | | 4/1999 | Bar-Cohen et al. |

FOREIGN PATENT DOCUMENTS

| EP | 0324297 A1 | 7/1989 |
| EP | 1507696 B1 | 7/2005 |
| GB | 2299063 A | 9/1996 |
| WO | WO 2004098984 A1 * | 11/2004 |

* cited by examiner

*Primary Examiner* — J. Allen Shriver, II
*Assistant Examiner* — Conan Duda
(74) *Attorney, Agent, or Firm* — Michael Soderman

(57) ABSTRACT

A climbing robot for travelling over adhesive surfaces with endless traction mechanisms (14) and, fastened to them at a distance, controllable adhesive feet (21) that circulate with the endless traction mechanisms (14) along guides (17) in the travel plane, by means of which the adhesive sides of their adhesive elements (15) always point towards the travel surface and wherein the adhesive elements (15) that support and move the climbing robot are switched "ON" and lowered onto the adhesive surface and all of the other adhesive elements (15) are switched "OFF" and raised from the adhesive surface, wherein the climbing robot has square running gear (11), one foot plate (13) each with a guide (17) running around the edges for a multitude of adhesive feet (21) driven by traction mechanisms is arranged in two diagonally opposite corner areas (18) of the running gear (11), wherein the foot plates (13) are attached to a support bar (12) of the running gear (11) and the adhesive feet (21) and therefore their adhesive elements (15) are routed through the guide (17) in such a way that they run in each case at a right angle around their corner area (18) of the square running gear (11) and along an arc (19) connecting the ends of this corner area (18), wherein both of the arcs (19) are on an inner circle enclosed by the square of the running gear (11).

9 Claims, 10 Drawing Sheets

CLIMBING ROBOT FOR TRAVELLING OVER ADHESIVE SURFACES

CROSS REFERENCE TO RELATED APPLICATIONS

This application is the U.S. national stage of International Application No. PCT/EP2010/005875, filed on Sep. 25, 2010, and claims the benefit thereof. The international application claims the benefits of German Application No. 102009047992.9 filed on Oct. 1, 2009; all applications are incorporated by reference herein in their entirety.

BACKGROUND

1. Field of Use of the Invention

The invention relates to a climbing robot for travelling over adhesive surfaces of nearly any desired geometry. Adhesive surfaces are intended to be understood as surfaces on which suction elements and/or magnetic elements could adhere. The geometry of the adhesive surfaces could be both flat and curved; it could extend in a flat, tilted or vertical fashion and could have small obstacles.

2. Prior Art

The use of automatic climbing devices that develop their holding power via magnetism or via a vacuum is known for movement on vertical or tilted adhesive surfaces; the term "vacuum" stands, strictly speaking, for underpressure. With regard to the type of movement, a distinction is made between walking gear and running gear. Both are especially designed for flat adhesive surfaces.

Walking gear only achieves working speeds of up to 3 m/min. at present. The movement takes place on a periodic basis with stops. Half of the suction cups have to be released, raised and moved ahead to achieve working speeds of 3 m/min. After that, these suction cups are lowered and the suction is applied. Subsequently, the remaining suction cups have to follow up with the same procedure. The available holding power will consequently continually vary between 50% and 100%.

If the suction cups are moved ahead or if they follow up in pairs or individually, the movement speed drops to well under 3 m/min. The high level of control and monitoring complexity for the individual movements is likewise a disadvantage. An advantage of devices of this type is the maneuverability, which can be simply realized via a lateral displacement crosswise to the direction of movement, and the ability that the device has right from the start to overcome small obstacles such as strips. Walking devices are described, for instance, in DE 24 58 491 A1, DE 198 35 03801, DE 199 07 437 A1, EP 0 401 120 A1, U.S. Pat. No. 4,674,949 A, U.S. Pat. No. 5,551,525 A, and U.S. Pat. No. 6,105,695 A.

Running gear achieves higher working speeds of up to 10 m/min. The movement is uniform without stops, and the work cycles—releasing adhesive elements, lifting, follow up, lowering and suction application—can simultaneously take place for the relevant adhesive elements. The holding power that is continually available consequently varies between 80% and 100%. The low level of control complexity is also advantageous, since the work cycles can be run with positive control. The inadequate maneuverability, such as a lateral displacement crosswise to the direction of movement, and the lacking capability in the base mechanism to overcome small profile sections or similar obstacles in vertical walls are drawbacks in the known running gear. Examples of crawlers with suction elements are in DE 35 40 432 A1, DE 197 27 421 C2, DE 101 40 990 A1, DE 296 22 167 U1, EP 0 505 956 A1, EP 584 520 B1, EP 1 792 673 A2, U.S. Pat. No. 5,487,440 A and U.S. Pat. No. 6,090,221 A, and those with magnetic elements are in EP 0 248 659 A2, EP 0 716 006 A2, EP 0 812 758 B1, EP 1 650 116 A1 and WO 2007/025553 A1.

With regard to the running gear, the crawler technology is the most practical solution at present.

The circulating endless traction mechanisms, such as chains, bands, cables or belts, that are in place to realize the movement, still have to be equipped with adhesive elements, however, and thus suction cups or magnets.

The principle is based on the fact that every adhesive element attached to an endless traction mechanism runs through an endless loop. The adhesive elements turned towards the running surface are actuated, and they hold the running gear to the adhesive surface. If the endless traction mechanisms are put into motion, the rear adhesive elements have to be switched "OFF" in each case so that they can be released from the adhesive surface and the endless traction mechanisms can swivel these adhesive elements upwards by 180°. The swiveled-around adhesive elements will consequently point in the direction turned away from the adhesive surface. The adhesive elements are transported in the direction of travel in that position and will be swiveled once again by 180°, whereupon they will be turned towards the adhesive surface again. The adhesive elements are now switched "ON" and can secure the running gear to the adhesive surface. After the running gear has gone past the adhesive elements that are switched "ON", they will be switched "OFF" once again and swiveled. This process continually repeats itself during travel for each individual adhesive element.

A drawback of the crawler technology is the fact that it can hardly overcome curved surfaces and profile sections. In addition, only very small adjustment maneuvers can be carried out. They also have a large overall height based on the design, because the adhesive elements go back overhead.

A robot based on crawler technology is known from EP 0 710 188 B1 with suction elements that go back overhead that is designed to travel over the outer skin of an aircraft in order to carry out inspection, cleaning or polishing work.

Thus, the robot likewise has a very high design, which interferes with its tipping-related stability in tilted areas or vertical areas.

A climbing robot based on crawler technology is known from DE 102 12 964 A1; its suction feet are mounted and routed according to the paternoster principle in such a way that their suction surfaces are nearly aligned in parallel with the surface. Details are not disclosed.

Finally, an automatic climbing mechanism for facades, especially glass facades, is described in EP 1 507 696 B1, which was used to form the preamble of the main claim; it likewise operates based on crawler technology, but its endless traction mechanisms equipped with adhesive elements circulate in the travel plane, which is why the adhesive sides of the adhesive elements always point towards the adhesive surface. The mechanism is very flat because of that. It can travel over tilted, vertical and overhanging walls, lift small loads and climb over facade profiles at a low height. It has a pair of endless traction mechanisms. The adhesive elements that support and move the running gear are switched "ON" and adhere to the adhesive surface; all of the others are lifted and switched "OFF". The chain pairs are run in straight, longitudinal sections that are parallel to one another and run back in an arc. The holding power during the work of a robot that is used is consequently dependent upon the length of the running gear. The running gear has to have an appropriate length. The steering maneuvers are more complex, because the running gear has to be rotated before the travel can be continued for a 90° turn. Furthermore, the running gear is not capable of traveling over curved surfaces, because the rigid, long frame cannot follow the curving profile of a surface.

SUMMARY

A climbing robot for travelling over adhesive surfaces with endless traction mechanisms (14) and, fastened to them at a distance, controllable adhesive feet (21) that circulate with the endless traction mechanisms (14) along guides (17) in the travel plane, by means of which the adhesive sides of their adhesive elements (15) always point towards the travel surface and wherein the adhesive elements (15) that support and move the climbing robot are switched "ON" and lowered onto the adhesive surface and all of the other adhesive elements (15) are switched "OFF" and raised from the adhesive surface, wherein the climbing robot has square running gear (11), one foot plate (13) each with a guide (17) running around the edges for a multitude of adhesive feet (21) driven by traction mechanisms is arranged in two diagonally opposite corner areas (18) of the running gear (11), wherein the foot plates (13) are attached to a support bar (12) of the running gear (11) and the adhesive feet (21) and therefore their adhesive elements (15) are routed through the guide (17) in such a way that they run in each case at a right angle around their corner area (18) of the square running gear (11) and along an arc (19) connecting the ends of this corner area (18), wherein both of the arcs (19) are on an inner circle enclosed by the square of the running gear (11).

DETAILED DESCRIPTION

Essence of the Invention

The task of the invention is to create a reasonably priced, operationally reliable, extremely maneuverable climbing robot with low weight and small dimensions that can travel in a remote-controlled fashion on a tilted, vertical, overhanging or even curved adhesive surface, rotate on the spot, turn at a 90° angle without a rotary movement and climb over small obstacles, that does not have to hang on cables or similar securing equipment and auxiliary resources and that can preferably be used for inspection, surface-treatment and maintenance work. The climbing robot should distinguish itself for travel operations with minimal control complexity and energy use and, for example, also be able to travel over the outer skins of aircraft, ship hulls and similar complicated surfaces in addition to flat, polished stone surfaces or metal surfaces and be able to overcome small obstacles in the process.

The problem is solved in accordance with the invention via the features specified in claim 1. The dependent claims point out advantageous designs and further developments.

A small, especially flat, relatively quick climbing robot has been created with the invention that can travel in a remote-controlled fashion on tilted, vertical, overhanging and/or curve adhesive surfaces, overcome small obstacles, turn on the spot and make a 90° change in direction without a turning maneuver, that requires a relatively low amount of control complexity and energy consumption and that does not have to hang on cables or similar auxiliary resources.

It is particularly suited for inspection, cleaning, maintenance and repair work on the outer skins of aircraft or ship hulls or otherwise on curved building surfaces that can only be traveled across with difficulty or that are not to be accessed at all if it can be avoided.

Examples of the Invention

The invention is to be explained in more detail with the aid of examples.

BRIEF DESCRIPTION OF THE DRAWINGS

The following are shown in the accompanying drawings.

Functionally equivalent components have been given the same reference numeral in all of the figures.

DETAILED DESCRIPTION OF THE PREFERRED EMBODIMENT

Figure 1:
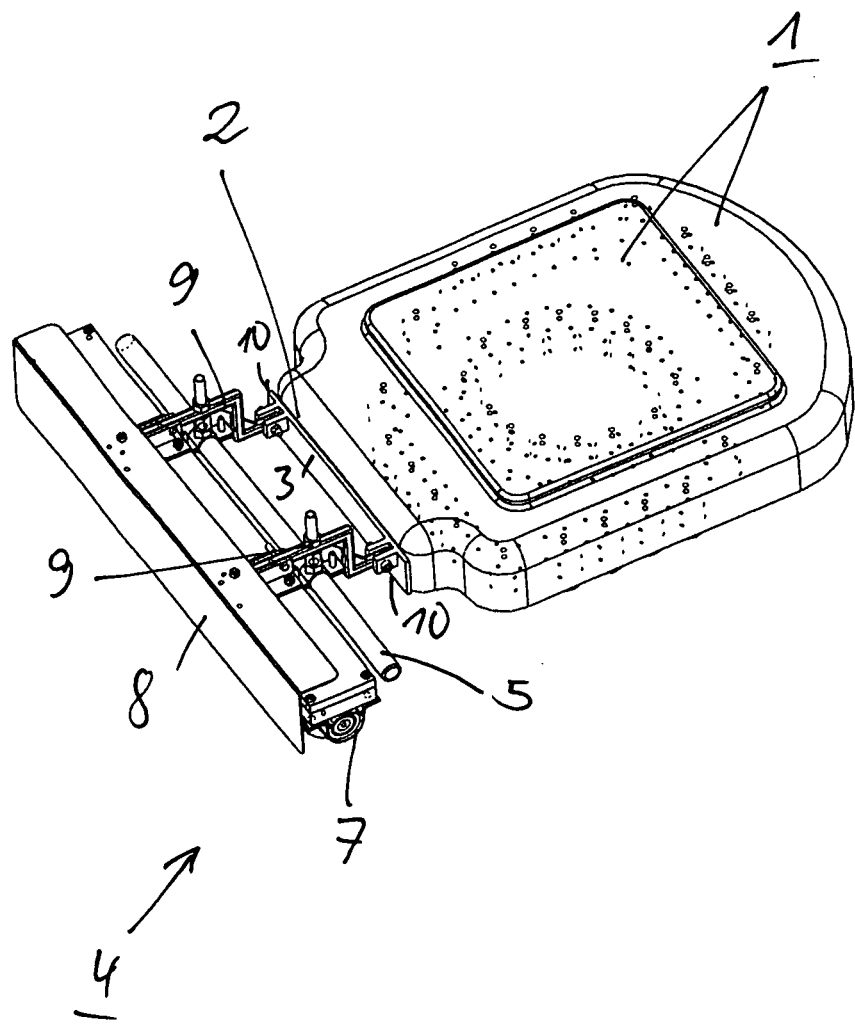
FIG. 1 shows a first variant of a climbing robot for surface treatment in a perspective view.

The cover of a climbing robot with an adapter 3 for a cleaning device 4 mounted on its end 2 can be seen in FIG. 1. The climbing robot travels with the cleaning device 4 over an adhesive surface that is not shown in more detail, for instance the outer skin of an aircraft. The cleaning device 4 has a spray pipe 5 along which nozzles 6 (FIG. 3) have been incorporated, a pneumatically driven cleaning roller 7 and a splash guard 8. These main parts can be adjusted vis-a-vis one another by means of an adjustment device 9. Furthermore, the cleaning device 4 can be set in terms of height by means of two pivot bolts 10 in the adapter 3. The cover 1 can carry a tank with cleaning fluid that is not shown or a supply hose that the cleaning fluid is pumped through from the ground can be connected to the spray pipe 5. Different cleaning systems can be connected to the adapter 3, for instance a dry-ice cleaning device, as is known from DE 102 33 304 B4, an ultrasonic cleaning device or a laser cleaning device.

Figure 2:
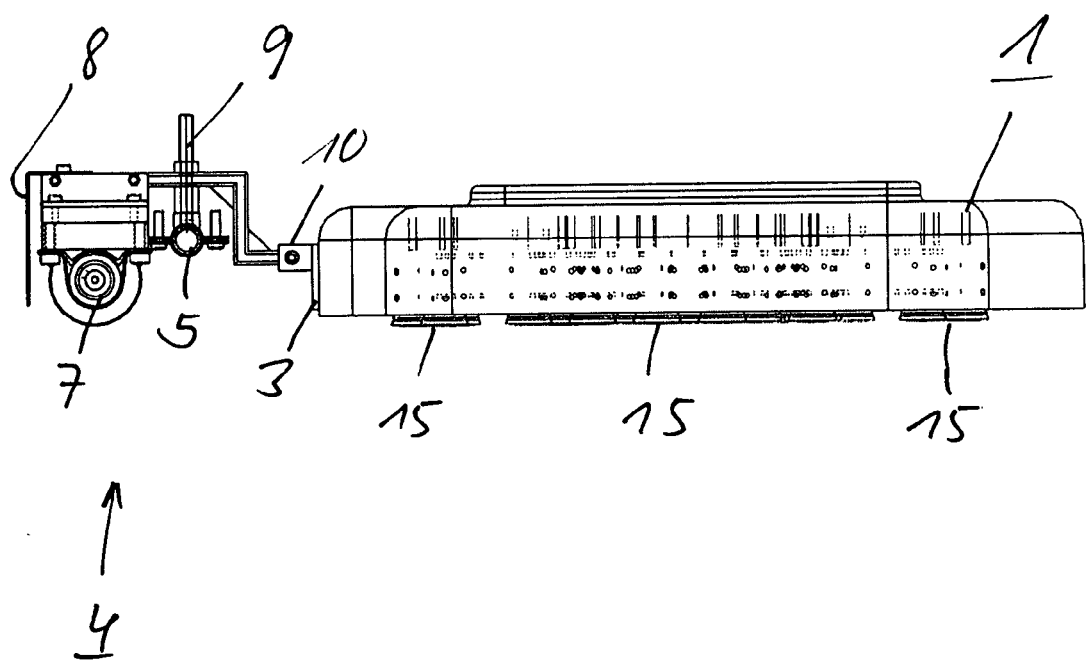
FIG. 2 shows a view of this climbing robot from the side.

FIG. 2 shows the climbing robot with an installed cleaning device 4 from the side. The cover 1 can be seen with the adhesive elements 15, concretely suction cups, projecting out. The adapter 3 with its pivot bolts 10 can be seen on the end. The spray pipe 5, the cleaning roller 7, the splash guard 8 and the adjustment device 9 are visible on the cleaning device 4. The cleaning device 4 can be swiveled upwards and lowered. The fact that the cleaning robot has a very small and flat design can be clearly seen.

Figure 3:
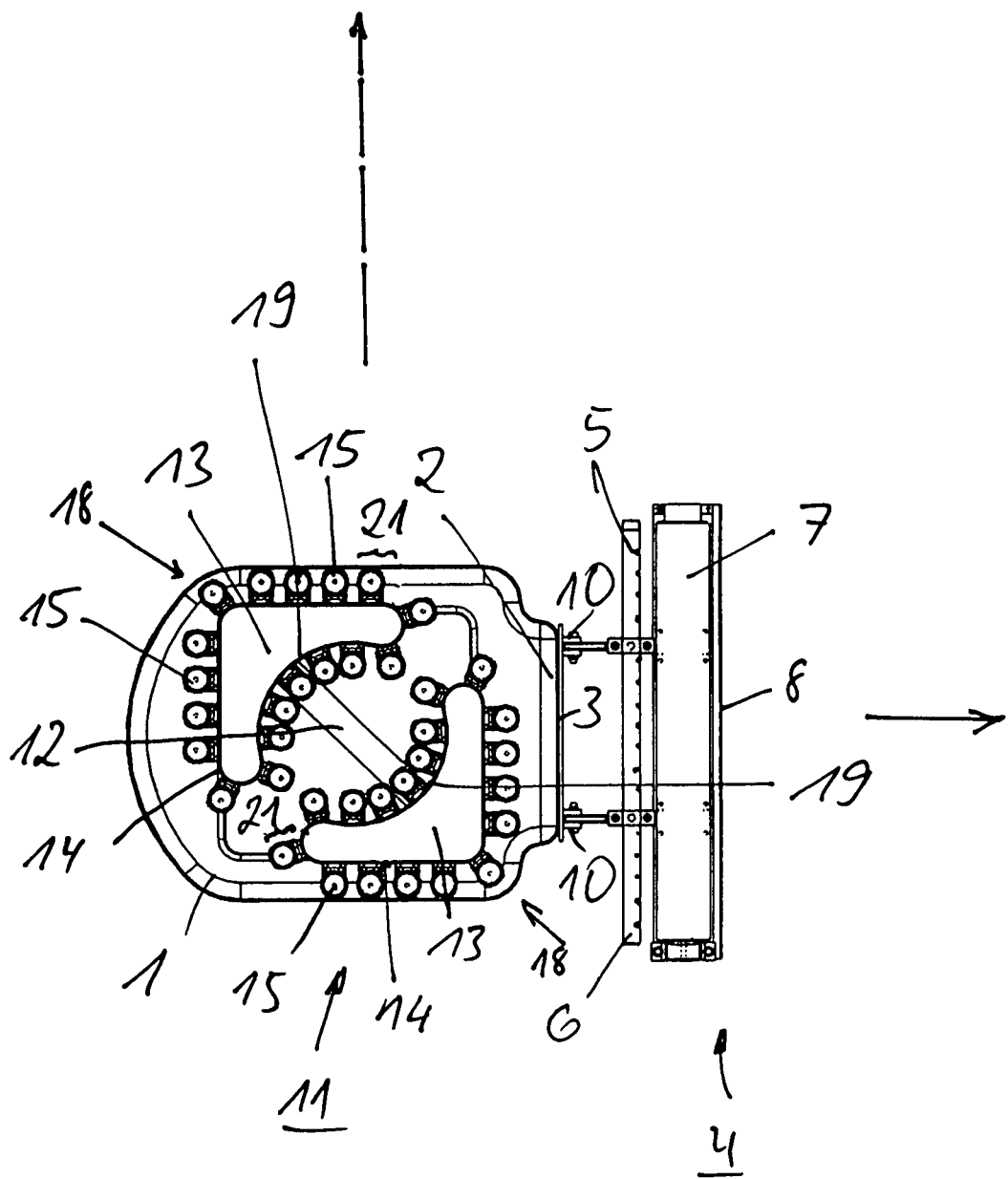
FIG. 3 shows a view of this climbing robot from the bottom.

FIG. 3 shows the climbing robot in accordance with FIG. 1 from the bottom. The bottom of the cover 1 and the cleaning device 4 fastened to the end 2 of the cover 1 by means of the adapter 3 can be seen. Furthermore, the pivot bolts 10 of the adapter 3 for the height adjustment of the cleaning device 4, the spray pipe 5 with its nozzles 6, the cleaning roller 7 and the splash guard 8 can be seen.

The cover 1 encloses the climbing robot on top and on the sides. The core of the climbing robot is its square running gear 11. It essentially has a oblong crossbar 12 that is symmetrical around its center and two foot plates 13 arranged on opposite corner areas 18 of the square. A number of adhesive feet 21, which are described in more detail with regard to FIG. 9 and which are pulled by endless traction mechanisms 14, run around the edges of the two foot plates 13.

The actual adhesive elements 15 are on the bottom of the adhesive feet 21. The crossbar 12 supports the cover 1, on the one hand, and the two foot plates 13, on the other hand, which are suspended in a cardanic fashion in the example, with details not otherwise shown, to the ends 16 (FIG. 5) of the crossbar 12 in such a way that they are in fact able to tilt, but are fixed in a rotary sense with regard to the foot plate 13. They can adapt to uneven running surfaces because of that.

Each endless traction mechanism 14 is driven by a motor that is not shown in more detail. As an example, a pintle chain is driven via a sprocket or a toothed belt via a gear on the shaft of an electrical or pneumatic gear motor. The motors are located between the ends of the crossbar 12 and the foot plates 13 on the latter. The edge areas of the foot plate 13 have special guides 17 (FIG. 9) for the adhesive feet 21.

Each foot plate 13 and therefore each guide 17 for the adhesive feet 21 is arranged and shaped on the edge in such a way that the adhesive feet 21 and therefore their adhesive elements 15 run in each case around one diagonally arranged corner 18 of the square running gear 11 and back, closing an inner arc 19; the two arcs 19 are in an imaginary inner circle that is enclosed by the square that is made up of the square running gear 11. The center of the crossbar 12 coincides with the center of the imaginary inner circle. Thus, the adhesive feet 21 run around the borders of the external edges of the foot plates 13 oriented towards the travel plane and not overhead. The adhesive areas of all of the adhesive elements 15 always point towards the adhesive surface because of that. The height of the running gear 11 and therefore of the climbing robot can be decisively reduced because of that. In addition, small obstacles against which the adhesive elements 15 would otherwise bump during swiveling can be overcome in that way.

The adhesive elements 15 can be controlled via their adhesive feet 21 in such a way that they can be vertically raised and lowered on an individual basis relative to the guides 17 and therefore to the adhesive surface, and thus the running surface; the adhesive elements 15 are switched "ON" in the lowered state and "OFF" in the raised state. The climbing robot moves in accordance with the adhesive elements 15 that are lowered and switched "ON"; the control unit of the two motors determines the direction "FORWARD", "BACKWARDS", "TO THE RIGHT", "TO THE LEFT", "ROTATE CLOCKWISE" or "ROTATE COUNTERCLOCKWISE".

If, as an example, the climbing robot is supposed to move to the right in the direction of the arrow (FIG. 3), and thus with its cleaning device 4 in front, the adhesive elements 15 that are aligned longitudinally in the direction of travel in their endless traction mechanism sections at the moment are activated. That involves a total of eight adhesive elements 15 in FIG. 3 on two outer, parallel endless traction mechanism sections; the four right-hand adhesive elements 15 in the direction of travel run clockwise around their foot plates 13 and the four left-hand adhesive elements 15 in the direction of travel run counterclockwise. All of the other adhesive elements 15 are lifted and switched "OFF".

If the climbing robot is supposed to move crosswise to the cleaning device 4, for example, in the direction of the arrow with the dashed line and therefore "upwards" in parallel with the cleaning roller 7, the adhesive elements 15 that are aligned in parallel with the cleaning roller 7 at the moment will be activated. That once again involves a total of eight suction cups in FIG. 3 on two straight areas of the endless traction mechanisms 14; the four right-hand adhesive elements 15 viewed in the direction of travel now run clockwise around their foot plates 13 and the four left-hand adhesive elements viewed in the direction of travel run counterclockwise. All of the other adhesive elements are lifted and switched "OFF".

The symmetrical, diagonal arrangement of the support plates 13 and therefore of the adhesive feet 21 makes it possible for the longitudinal and crosswise movements of the climbing robot to take place on an equal basis.

If the climbing robot is supposed to rotate by an angle, a total of 14 suction cups will be activated, namely all of the suction cups that are in the imaginary inner circle at the moment that the two foot plates 13 define; both of the endless traction mechanisms 14 rotate in the same rotary direction in the process. All of the other adhesive elements 15 are lifted and switched "OFF".

Figure 4:
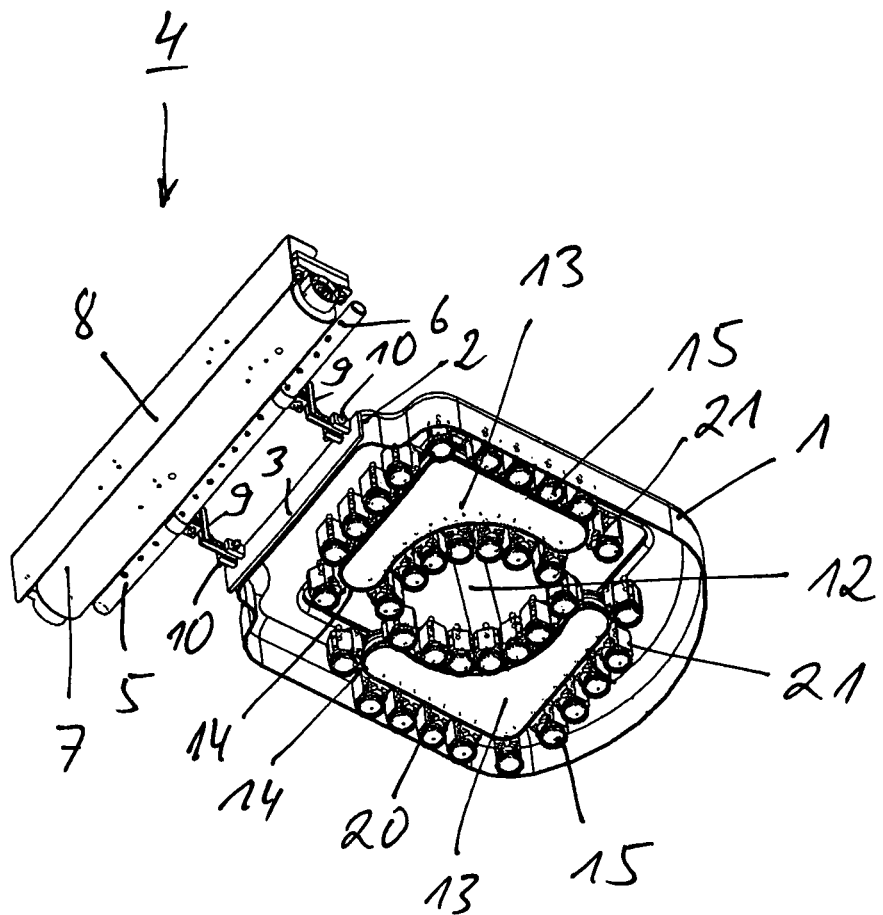
FIG. 4 shows a perspective view from the bottom.

The climbing robot is show once again in a perspective view from the bottom in FIG. 4. The two foot plates 13, with their adhesive feet 21 with adhesive elements 15 on the bottom pulled by endless traction mechanisms 14, that are suspended in a cardanic or fixed manner to the ends of the crossbar 12 can be easily seen from this perspective. The cleaning device 4 is mounted on the end 2 of the cover 1 via the adapter 3.

Figure 5:
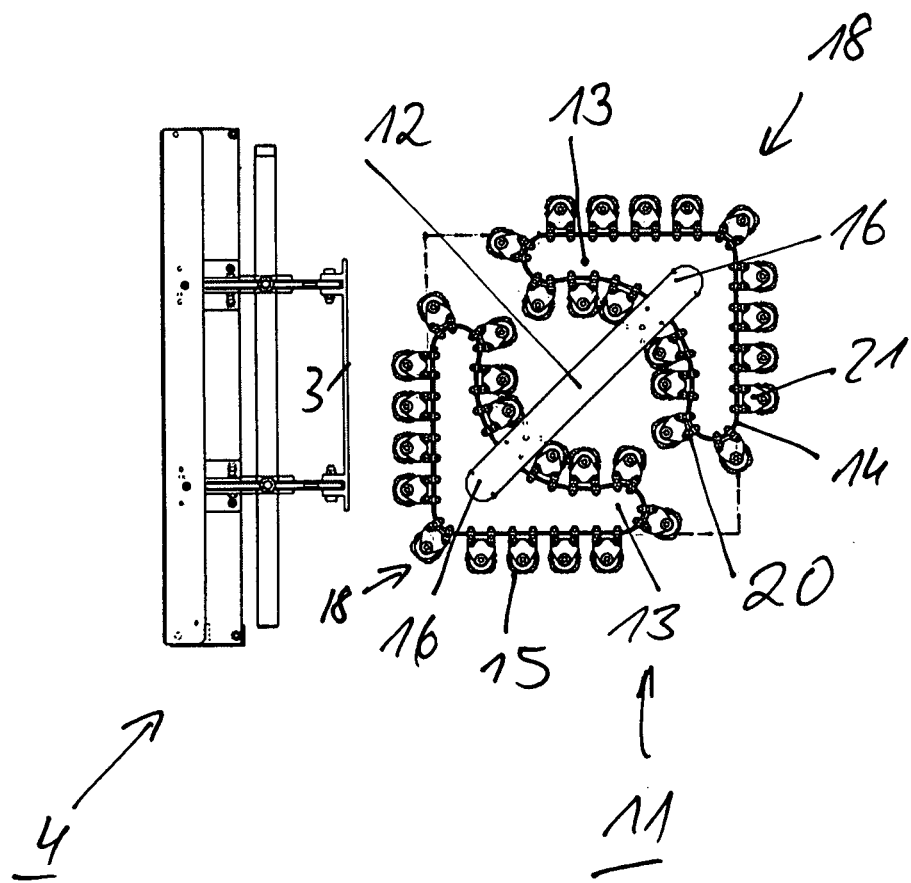
FIG. 5 shows the climbing robot with the cover removed.

FIG. 5 shows the climbing robot from the top in diagram form with the cover 1 removed. A foot plate 13 with adhesive feet 21 running around it is attached in the two corner areas 18 of the running gear 11 to each end 16 of the oblong crossbar 12. The endless traction mechanisms 14 and holders 20 with the aid of which the adhesive feet 21 run around the edges of the foot plates 13 can be seen. The cleaning device 4 is coupled to the adapter 3. The outer edges of the foot plates 13 are in an imaginary square; the inner edges of the foot plates 13 are in an imaginary circle that is enclosed by the square and that has a center coinciding with the center of the support plate 12.

Figure 6:
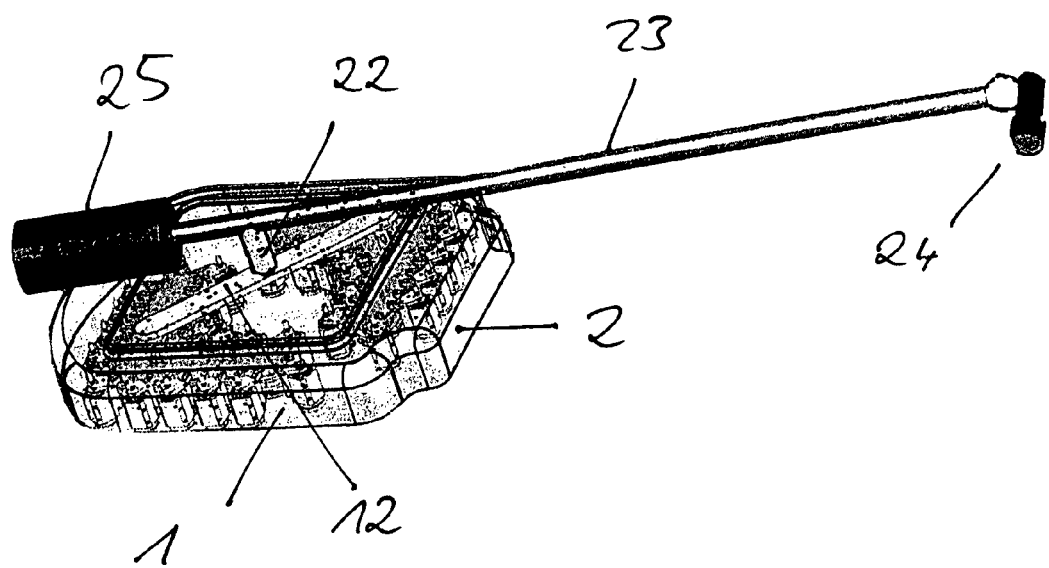
FIG. 6 shows a variant of a climbing robot with an inspection device in a perspective view.

A variant of a climbing robot with an inspection device is shown in a perspective view and in a transparent form in FIG. 6. A shaft 22 is mounted on the support plate 12 and centrally penetrates the cover 1. But it can also be attached to the cover 1 itself. A device arm 23 with a camera 24 installed at its front end so as to be capable of rotary motion and with a counterweight 25 at its rear end with an interface for the cameras 24 is attached to the shaft 22.

The interface could be a wireless communication interface, an optical interface or a cable coupling, for instance. The shaft 22 itself can be attached in a fixed or rotating manner. The outer skin of an aircraft or a silo wall can be investigated for anomalies, for example, with the aid of the camera 24. Other inspection devices such as a camcorder or a heat image camera can also be installed on the device arm 23, of course. The small and especially flat running gear 11 of the climbing robot can be clearly made out.

Figure 7:
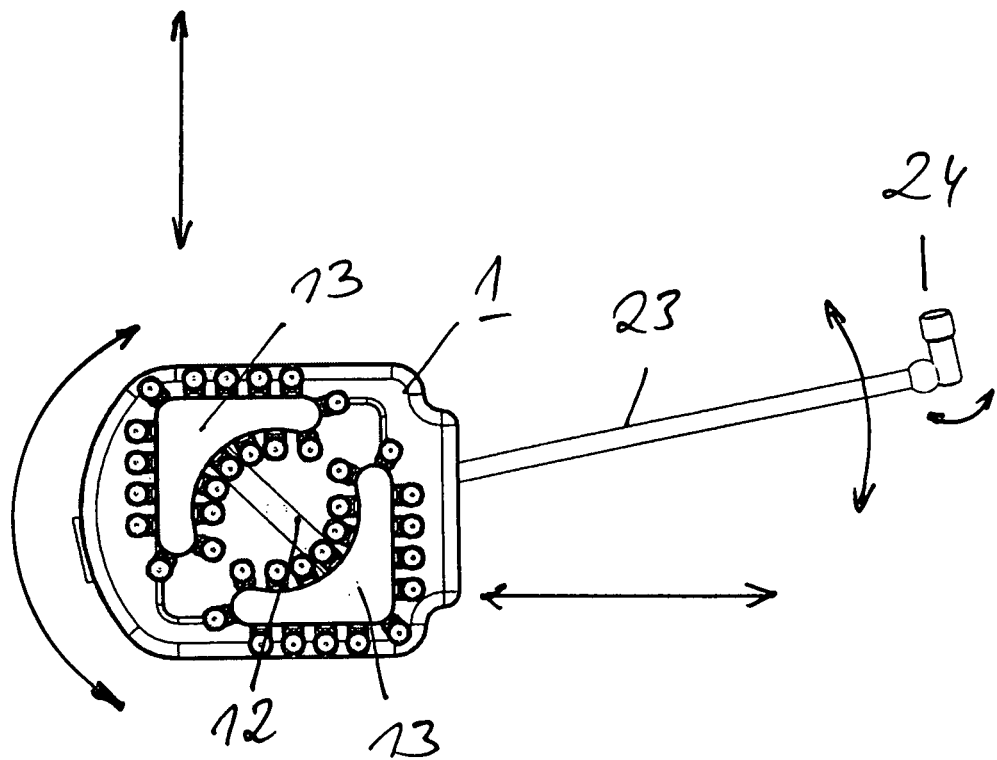
FIG. 7 shows a view of this climbing robot from the bottom.
Figure 8:
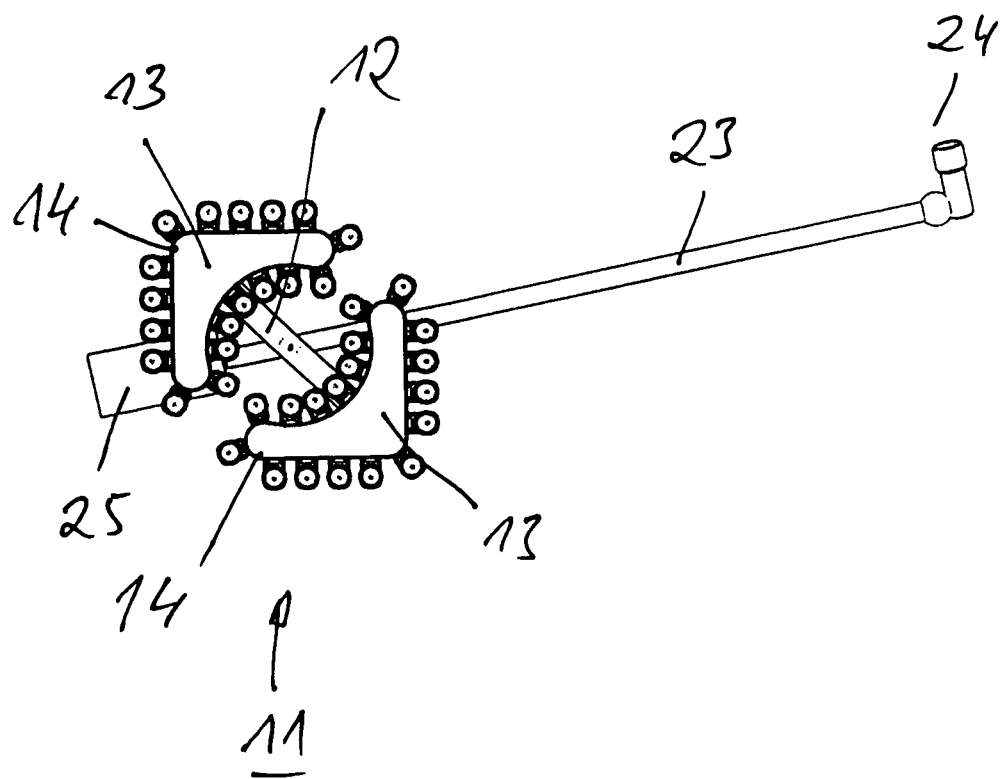
FIG. 8 shows a view from the bottom with the cover removed.

The variant according to FIG. 6 is shown in FIG. 7 once again from the bottom and is shown in FIG. 8 from the bottom with the cover 1 removed. The arrows entered in FIG. 7 illustrate the motor-controllable maneuverability of the running gear 11, the device arm 23 and the inspection device 24. The motors for driving the endless traction mechanisms 14 are beneath the ends of the crossbar ends 16 (FIG. 5) on the foot plates 13 and are not visible. A motor providing the rotary-movement capability of the device arm 23 is on its axis of rotation, and a further motor provides for the adjustability of the camera 24.

18 adhesive feet 21 are attached to and distributed over the length of each of the two endless traction mechanisms 14 of the climbing robot. Overall, therefore, the climbing robot operates with 36 adhesive feet 21 in the example.

Figure 9:
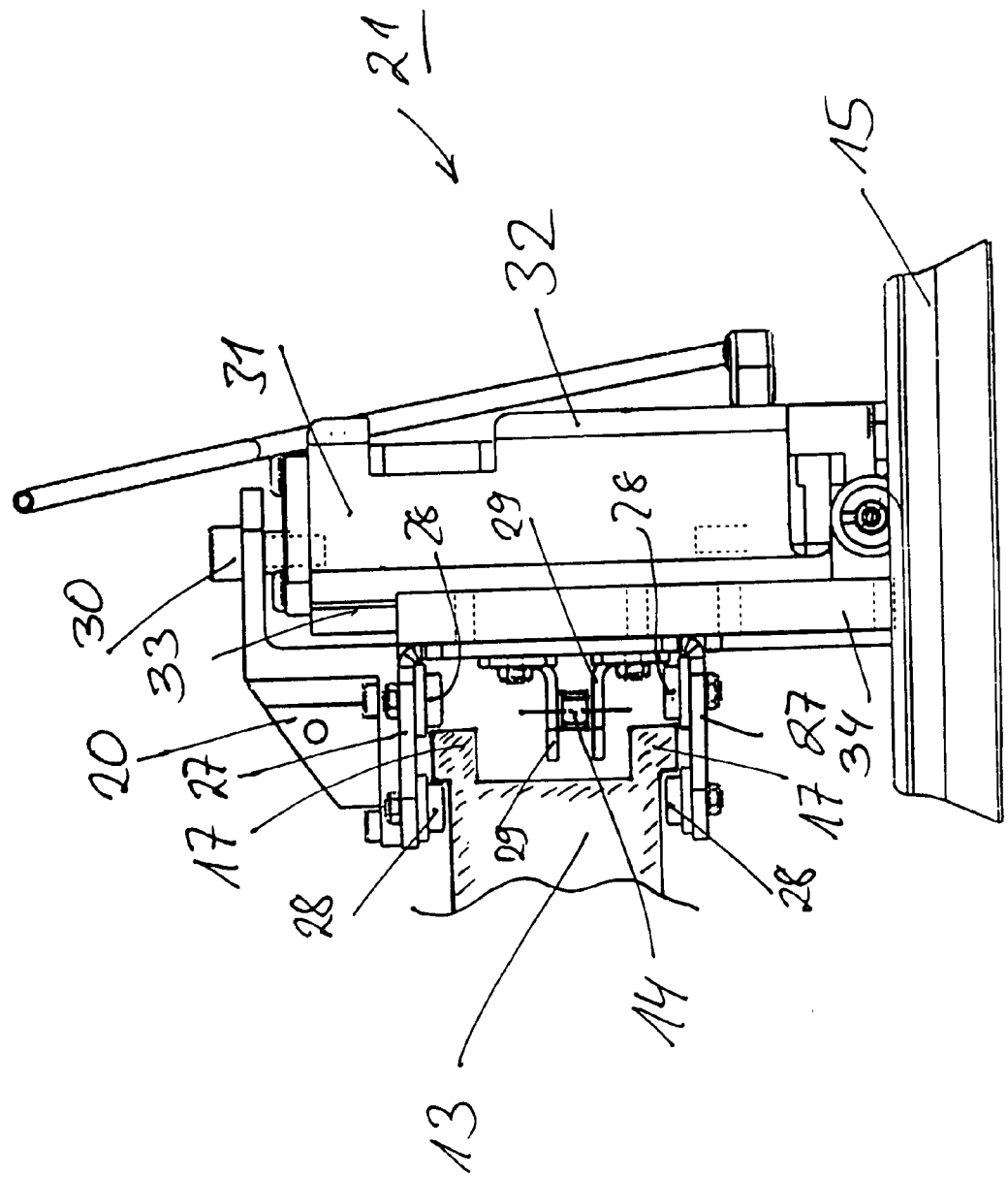
FIG. 9 shows an individual adhesive foot with a suction cup and FIG. 10 shows an individual adhesive foot with a switching magnet.

An adhesive foot 21 for suction cups as adhesive elements 15 is shown in more detail with a raised position of the suction cup in FIG. 9. The holder 20 holds the adhesive foot 21 to the effect that it can in fact run around its foot plate 13, pulled by the traction mechanism, but it will not drop off. Upper and lower guide plates 27 with guide rollers 28 extend out from it.

The outer edge of the foot plate 13 has an upper projecting edge and a lower projecting edge. The adhesive foot 21 is guided along these edges with its guide rollers 28. In addition, two supporting brackets 29, between which the endless traction mechanism 14 is routed, are attached to the holder 21 between the two guide plates 27. The endless traction mechanism 14 is, as an example, a pintle chain along the lines of a bicycle chain. The adhesive foot 21 is connected with good tensile strength to the pintle chain with a pin that goes through the supporting bracket 29 and a bushing of the passed-through pintle chain.

The holder 20 supports a fixed, vertical piston rod 30 of a piston cylinder unit; the height of its lifting cylinder 31 is adjustable along the piston rod 30 and the suction cup 15 is attached to its bottom side. The piston cylinder unit 30, 31 and the suction cup 15 are pneumatically actuated; a control unit 32 provides the management.

The lifting cylinder 31 with its suction cup 15 can be lowered or raised via air pressure on the lifting cylinder 31 of the piston cylinder unit 30, 31. The piston rod 30 is fixed in place. Either a vacuum is generated in the suction cup 15 for the adherence function or, on the other hand, compressed air is blown in to release the suction cup 15 more quickly from the running surface. Each adhesive foot 21 can be individually lowered and provided with suction or vented and lifted by means of a higher-level management system in this way. A prismatic guide, consisting of a sliding carriage 33 integrated into the adhesive foot 20 and a carriage track 34 supported by the holder 20, additionally leads the adhesive foot to the piston cylinder unit 30, 31.

What applies above to suction cups 15 as adhesive elements also applies to switching magnets. Instead of having an ejector to generate a vacuum for a suction cup 15, the switching magnet is electromagnetically excited. It is understood that a ferromagnetic adhesive surface is required for magnetic adhesive elements.

Figure 10:
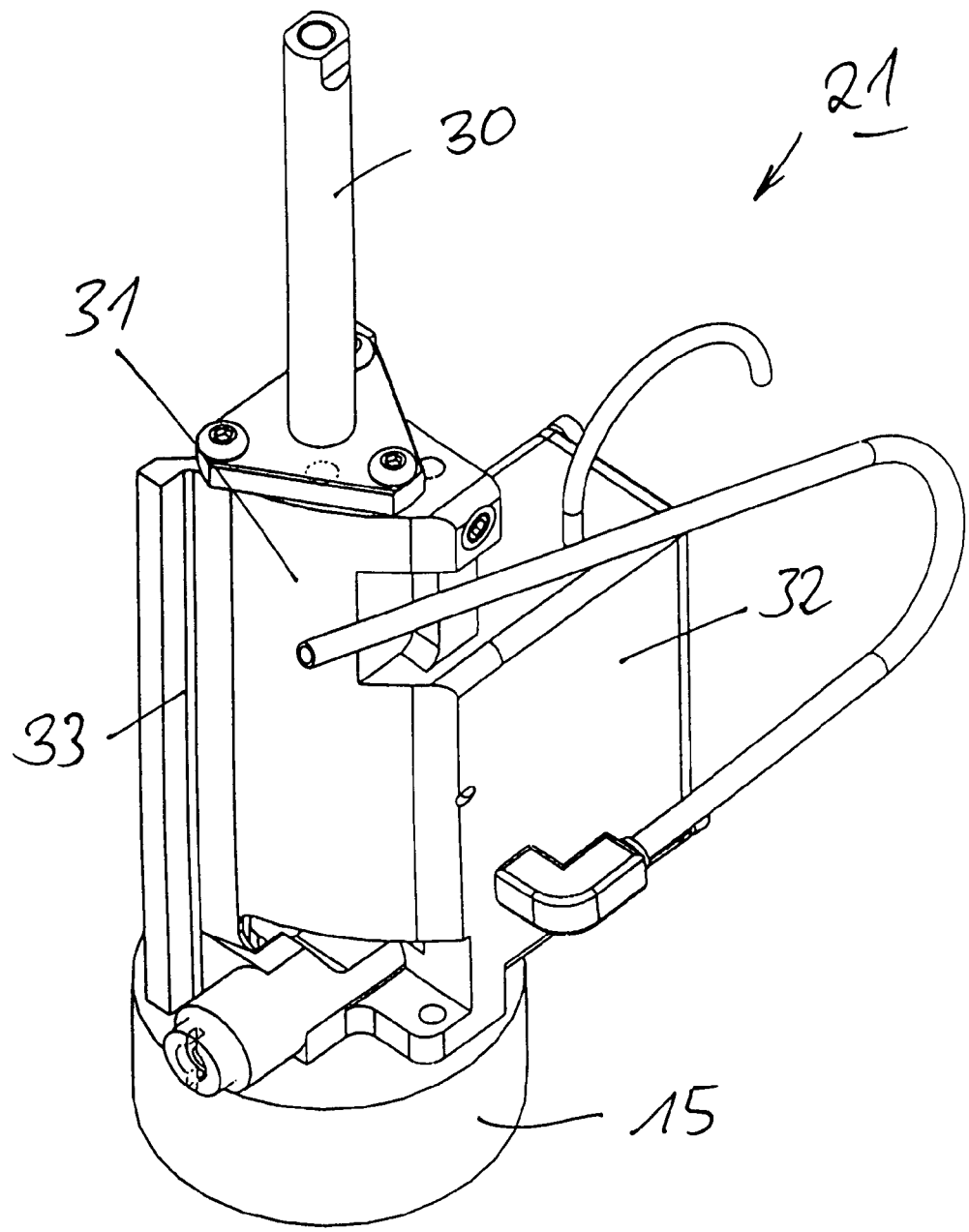

An adhesive foot 21 with a switching magnet as the adhesive element 15 is shown in more detail in FIG. 10. The piston rod 30 is fixed once again and the cylinder 31 is movable. The switching magnet is raised and lowered via the piston cylinder unit 30, 31. The lowered position of the adhesive element 15 is shown. The support fixture is not shown with the exception of the sliding carriage 33. Reference can be made to the statements above for FIG. 9 with regard to the routing and with regard to the circulation of the adhesive foot 21 around the foot plate 13.

Instead of pneumatic actuation of the adhesive elements, the raising and lowering can also be brought about electromagnetically (linear cylinder), with a spindle or with a rack and pinion.

A microcontroller controls the chronological sequence of the actuation and adhesion statuses of the adhesive feet 21 in collaboration with sensors and pneumatic actuators and control elements. In addition, a check is continually done in operation as to whether a sufficiently strong adhesive force exists to prevent a crash of the robot on critical running surfaces. If a risk of falling short of an adhesive force set in accordance with the program exists, for instance because an impermissibly high number of adhesive elements 15 are not making contact with the running surface (edge, unsuitable travel surface conditions or a malfunction), the running gear automatically stops.

LIST OF REFERENCE NUMERALS

1 Cover
2 End of the cover
3 Adapter
4 Cleaning device
5 Spray pipe
6 Nozzles
7 Cleaning roller
8 Splash guard
9 Adjustment device
10 Pivot bolt
11 Running gear
12 Oblong crossbar
13 Foot plate
14 Endless traction mechanism (chain, toothed belt)
15 Adhesive element (suction cup, switching magnet)
16 Support bar end
17 Guide around the foot plate
18 Corner area of the square running gear
19 Arc
20 Holder
21 Adhesive foot
22 Shaft
23 Device arm
24 Camera
25 Counterweight
27 Guide plate
28 Supporting bracket
29 Guide roller
30 Piston rod
31 Lifting cylinder
32 Control unit
33 Sliding carriage
34 Carriage track

The invention claimed is:

1. A climbing robot for travelling over adhesive surfaces along a travel plane, the climbing robot comprising:
   square running gear (11) having corner areas (18);
   a support bar (12) having a center and two symmetrical ends (16), the support bar (12) designed as a crossbar;
   two foot plates (13) arranged in two diagonally opposite corner areas (18) of the running gear (11), and each of the foot plates (13) attached to the support bar (12) of the running gear (11) so that the foot plates are able to tilt with respect to one another;
   a guide (17) coupled to and running around the edges of each foot plate (13);
   endless traction mechanisms (14) operatively coupled to each of the foot plates (13);
   controllable adhesive feet (21) fastened to and driven by the endless traction mechanisms (14) at a predetermined distance and which circulate with the endless traction mechanisms (14) along the guides (17) in the travel plane, the controllable adhesive feet (21) comprising;
      adhesive elements (15) having adhesive sides which always point towards the adhesive surface and wherein the adhesive elements (15) that support and move the climbing robot are switched ON and lowered onto the adhesive surface and all of the other adhesive elements (15) are switched "OFF" and raised from the adhesive surface, wherein the adhesive feet (21) are routed through the guides (17) and run respectively along each of the foot plates (13) at a right angle around the respective corner areas (18) of the square running gear (11) and along an arc (19) opposite the respective corner areas (18); and wherein both of the arcs (19) are disposed along an inner circle enclosed by the square running gear (11) and the center of the support bar (12) coincides with the center of the inner circle.

2. Climbing robot according to claim 1, characterized in that all of the adhesive elements (15) located in sections of the guides (17) parallel with the direction of travel of the climbing robot are switched "ON" and lowered for straightaway travel of the climbing robot and the endless traction mechanisms (14) move the adhesive elements (15) in the same direction of either forwards or backwards, all of the adhesive elements (15) located along the arcs (19) formed by the guides (17) and within the inner circle are switched ON and lowered for a rotary movement of the climbing robot and the endless traction mechanisms (14) move the adhesive elements (15) in the same direction of either clockwise or counterclockwise, and all of the adhesive elements (15) located in sections of the guides (17) at a 90° angle to the direction of travel are switched ON and lowered for a travel to the right or to the left and the endless traction mechanisms (14) move the adhesive elements (15) in the same direction of either right or left.

3. Climbing robot according to claim 1, characterized in that the adhesive elements (15) are suction cups or switching magnets and every adhesive element (15) is at the end of a lifting cylinder (31) of a piston cylinder unit (30, 31) of an adhesive foot (21) that can be routed on a holder (20) around the foot plate (13) and that can be driven by the endless traction mechanism (14).

4. Climbing robot according to claim 3, characterized in that the piston cylinder units (30, 31) and adhesive elements (15) are pneumatically and/or electromagnetically actuated and controlled by a higher-level control unit.

5. Climbing robot according to claim 1, characterized in that the support bar (12) carries a cover (1) for the climbing robot.

6. Climbing robot according to claim 5, characterized in that the cover (1) supports an adapter (3) for an exchangeable work device (4).

7. Climbing robot according to claim 1, characterized in that the support bar (12) or the cover (1) supports a vertical, rotating or fixed shaft (22) for a device arm (23) of an optical inspection device (24).

8. Climbing robot according to ewe claim 1, characterized in that the climbing robot carries a cleaning device (4) or an inspection device (24).

9. Climbing robot according to claim 8, characterized in that the climbing robot, the cleaning device (4) and the inspection device (24) are capable of remote control.

* * * * *